Oct. 13, 1964    R. J. ROWEKAMP    3,152,442
SYSTEM FOR CONVERTING SOLAR ENERGY INTO USEFUL ENERGY
Filed May 4, 1962    2 Sheets-Sheet 2

INVENTOR.
RICHARD J. ROWEKAMP
BY Pearce & Schaeperklaus

ATTORNEYS

United States Patent Office

3,152,442
Patented Oct. 13, 1964

3,152,442
SYSTEM FOR CONVERTING SOLAR ENERGY
INTO USEFUL ENERGY
Richard J. Rowekamp, Springfield Township, Hamilton
County, Ohio (420 Hilltop Lane, Cincinnati 15, Ohio)
Filed May 4, 1962, Ser. No. 192,390
5 Claims. (Cl. 60—26)

This invention relates to a solar power plant or to a system for converting solar energy into useful energy. This application is a continuation in part of my copending applications Serial No. 92,734, filed February 27, 1961, now abandoned, and Serial No. 94,666, filed March 8, 1961, now abandoned. Furthermore, this invention represents an improvement over the system shown in my Patent No. 2,969,637.

An object of this invention is to provide a system by which solar energy can be converted into useful energy and by which, in addition, solar energy can be converted into heat energy for storing and use during periods when sunlight is not available.

A further object of this invention is to provide a system using two fluids, one of which can be a halogentated hydrocarbon and is herein referred to as a motive fluid and the other of which can be water or the like, and is herein referred to generally as a heat storage or heat exchange fluid, and in which solar energy is used for heating the motive fluid and the heat storage fluid when sunlight is available and in which, during periods when sunlight is not available, the heat storage fluid is used for heating the motive fluid.

A further object of this invention is to provide a system of this type in which the motive fluid, after passing through an energy utilizing device, such as a turbine, is used for heating a portion of the heat storage fluid and in which the heat storage fluid is used for a first stage of cooling of the motive fluid following use thereof.

The above and other objects and features of this invention will be apparent to those skilled in the art to which this invention pertains from the following detailed description and the drawings, in which.

In the following detailed description, and the drawings like reference characters indicate like parts.

Figure 1:
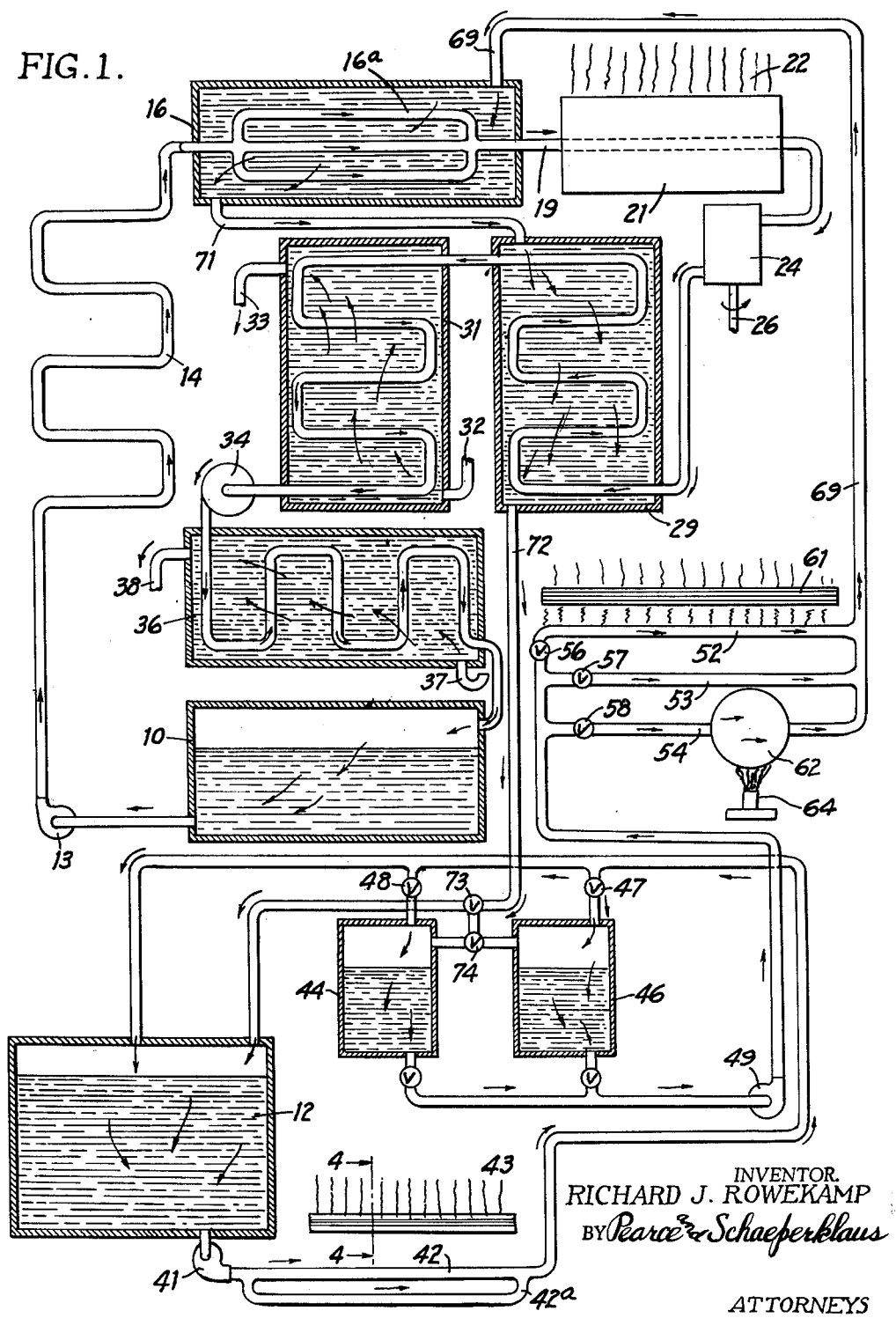
FIG. 1 is a schematic view showing a system constructed in accordance with an embodiment of this invention.
Figure 2:
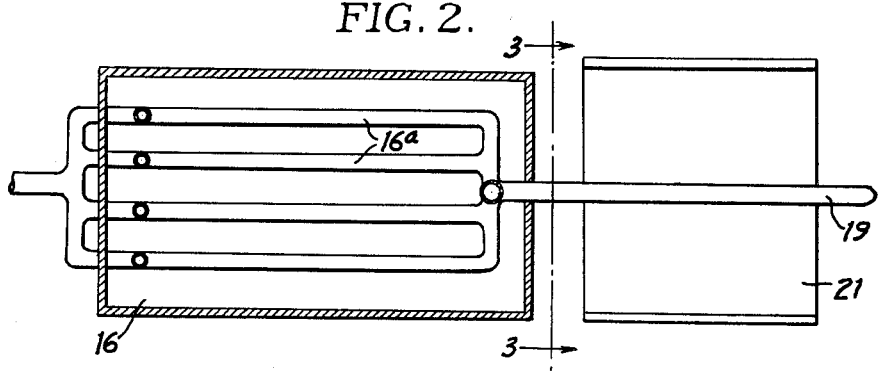
FIG. 2 is a view partly in plan and partly in horizontal section of a portion of the system illustrated in FIG. 1.
Figure 3:
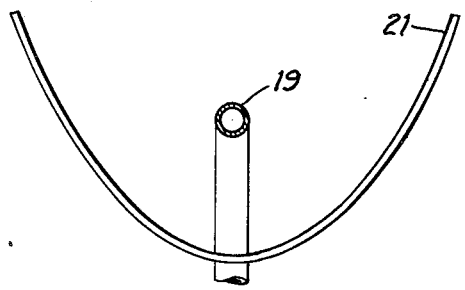
FIG. 3 is a view in section taken on the line 3—3 in FIG. 2.

In FIG. 1, is illustrated a system constructed in accordance with an embodiment of my invention. The system includes a motive fluid storage tank 10 and a heat storage fluid tank 12. The motive fluid can be an appropriate halogenated hydrocarbon. I prefer to use either dichloromonofluoromethane, dichlorodifluoromethane, or dichlorotetrofluoroethane as motive fluid. However, other appropriate halogenated hydrocarbons and particularly the fluorinated hydrocarbons merchandised under the name of "Freon" can be substituted therefor. The motive fluid is pumped from the storage tank 10 by a pump 13 to a coil 14 which is exposed to ambient air for heating the motive fluid to air temperature. Then the motive fluid passes through a heat accumulator or heat exchanger 16. The heat accumulator 16 contains heat storage fluid which heats the motive fluid. The pipe carrying the motive fluid feeds into a plurality of branches 16a in the accumulator 16. From the heat accumulator 16, the motive fluid passes through a solar heating line or pipe 19 which, in turn, passes along the focus of a generally parabolic mirror 21, which can be formed of aluminum or the like and which concentrates energy from the sun's rays 22 upon the pipe 19 to heat the motive fluid to an elevated temperature and to vaporize and expand the motive fluid. The mirror 21 can be of a size to permit heating of the fluid to desired temperatures when exposed to bright sun light. With the preferred motive fluids, a maximum temperature of about 400° F. is suitable. From the pipe 19 the motive fluid passes through a turbine 24 having an output shaft 26 driven by the motive fluid. Thence, the motive fluid passes through a first stage condenser 29 in which the motive fluid passes in counter-current relationship to heat storage fluid coming from the heat accumulator. From the first stage condenser 29, the motive fluid passes through a second stage condenser 31 in which the motive fluid passes in counter-current relationship to flow of cooling water, which may be water drawn from a river or the like which cools the motive fluid to approximately river temperature. The cooling river water enters through an inlet pipe 32 and leaves the second stage condenser through an outlet pipe 33.

The motive fluid then passes to a compressor 34 which elevates the pressure in the motive fluid to a sufficiently high pressure that the motive fluid can be stored under elevated pressure and as a liquid in the motive fluid storage tank 10. From the compressor 34, the motive fluid passes through a third stage condenser 36 through which cooling river water flows to condense the motive fluid to a liquid for storage in the motive fluid storage tank 10. The cooling river water enters through an inlet pipe 37 and leaves the third stage condenser through an outlet pipe 38.

Figure 4:
FIG. 4 is a view in section taken on the line 4—4 in FIG. 1.

Heat storage fluid from the tank 12 passes through a pump 41 which pumps the heat storage fluid along lines 42 and 42a. The line 42 is shown mounted below an elongated lens 43 (FIG. 4). The lens 43 may be of the type known as a "Fresnel" lens and can be made of appropriate transparent plastic material or the like and concentrates sun's rays on the pipe 42 to heat the heat storage fluid as it leaves the storage tank 12. A similar lens (not shown) can concentrate sun's rays on the pipe 42a. Additional pipes (not shown) can be provided parallel to lines 42 and 42a and can be supplied with additional similar lenses (not shown). The pipe 42 then directs the heated fluid either back into the storage tank 12 or into insulated hot fluid storage tanks 44 and 46. Valves 47 and 48 control disposition of the heated heat storage fluid. From the hot fluid storage tanks 44 and 46, the heat storage fluid is pumped by a pump 49 either along a solar heating line 52, a by-pass line 53, or an externally heated line 54. Valves 56, 57, and 58 control flow in the lines 52, 53, and 54. When sunlight is available, the heat storage fluid is pumped along the solar heating line 52, which is disposed beneath an elongated lens structure 61, which may also be of the "Fresnel" type which further heats the heat storage fluid. When sunshine is not available, the heat storage fluid can be pumped along the by-pass line 53. In the event that added heat is required, as during prolonged periods when sunshine is not available, the heat storage fluid can be passed along the line 54 through a heating chamber 62 heated by an appropriate external heating means 64. From the lines 52, 53, and 54, the heat storage fluid passes along a line 69 to the heat accumulator 16 where the heat storage fluid heats the motive fluid flowing in counter-current heat exchange therewith. Therefrom, the heat storage fluid passes along a line 71 to the first stage condenser 29 and thence through a line 72 to be returned to the hot fluid storage tanks 44 and 46 or to the main heat storage fluid tank 12 as directed by valves 73 and 74.

During periods of sunshine, the heat storage fluid is heated, and heated fluid is stored in the hot storage tanks 44 and 46. Only two hot storage tanks are shown, but any desired number thereof can be provided. At night, or at other times when sunshine is not available, the heated heat storage fluid from the hot storage tanks 44 and 46 is used for heating the motive fluid. After the heat storage fluid has been used for heating the motive fluid in the heat accumulator and for cooling the motive fluid in the first stage condenser, it can be returned to the hot storage tanks 44 and 46 or to the main heat storage fluid tank 12.

The system shown in the drawings and described above is subject to structural modification, for example all pipes and coils can have a plurality of branches, without departing from the spirit and scope of the appended claims.

Having described my invention, what I claim as new and desire to secure by Letters Patent, is:

1. A system for converting solar energy into mechanical energy which comprises a motive fluid storage means, a conduit, means for pumping motive fluid from the motive fluid storage means to the conduit, a heat exchanger receiving the motive fluid from said conduit, means for passing a heat storage fluid in heat exchange relation with the motive fluid in the exchanger, a solar heating line receiving the motive fluid from the heat exchanger, means for concentrating solar energy on the solar heating line to heat the motive fluid therein, turbine means receiving the motive fluid from the solar heating line to be driven thereby, a first stage condenser and a second stage condenser connected in series and receiving the motive fluid from the turbine means, means for directing cooling fluid in heat exchange relation with the motive fluid in the second stage condenser, a compressor receiving the motive fluid from the second stage condenser, a third stage condenser receiving the motive fluid from the compressor, means for directing cooling fluid in heat exchange relation with motive fluid in the third stage condenser, means for directing motive fluid from the third stage condenser to the motive fluid storage means, the pumping means retaining the motive fluid in the motive fluid storage means, the compressor being adapted to hold the motive fluid in the motive fluid storage means at a sufficient pressure to remain liquid at ambient temperature, a solar heating line receiving heat storage fluid from the heat storage fluid storing means, a hot fluid storage tank receiving heated heat storage fluid, means for conducting the heated heat storage fluid from the hot storage tank to the heat exchanger to pass in counter-current heat exchange relation with the motive fluid approaching the first mentioned solar heating means, means directing the heat storage fluid from the heat exchanger to the first stage condenser to pass in heat exchange relation with the motive fluid leaving the turbine, and means for returning the heat storage fluid to the heat storage fluid storage means.

2. A system for converting solar energy into mechanical energy which comprises a motive fluid storage means, means for pumping motive fluid from the motive fluid storage means, a heat exchanger receiving the motive fluid from the storage means, means for passing a heat storage fluid in heat exchange relation with the motive fluid in the heat exchanger, a solar heating line receiving the motive fluid from the heat exchanger, means for concentrating solar energy on the solar heating line to heat the motive fluid therein, turbine means receiving the motive fluid to be driven thereby, a first stage condenser and a second stage condenser connected in series and receiving the motive fluid from the turbine means, means for directing cooling fluid in heat exchange relationship with the motive fluid in the second stage condenser, means for directing motive fluid from the second stage condenser to the motive fluid storage means, means for storing the heat storage fluid, a solar heating line receiving heat storage fluid from the heat storage fluid storing means, a hot fluid storage tank receiving heated heat storage fluid, means for conducting the heated heat storage fluid from the hot storage tank to the heat exchanger to pass in counter-current heat exchange relation with the motive fluid approaching the first mentioned solar heating means, means directing the heat storage fluid from the heat exchanger to the first stage condenser to pass in heat exchange relation with the motive fluid leaving the turbine, and means for returning the heat storage fluid to the heat storage fluid storage means.

3. A system for converting solar energy into mechanical energy which comprises a motive fluid storage means, means for pumping motive fluid from the motive fluid storage means, a heat exchanger receiving the motive fluid from the storage means, means for passing a heat storage fluid in heat exchange relationship with the motive fluid in the heat exchanger, a solar heating line receiving the motive fluid for heating the motive fluid, turbine means receiving the heated motive fluid to be driven thereby, a condenser receiving the motive fluid from the turbine means, means for directing cooling fluid in heat exchange relationship with the motive fluid in the condenser, means for directing the motive fluid from the condenser to the motive fluid storage means, means for storing the heat storage fluid, means for heating the heat storage fluid, a hot fluid storage tank receiving heated heat storage fluid, means for conducting the heated heat storage fluid from the hot storage tank to the heat exchanger to pass in heat exchange relation with the motive fluid approaching the turbine during periods when solar energy is unavailable, and means for returning the heat exchange fluid to the heat exchange fluid storage means.

4. A system for converting solar energy into mechanical energy which comprises a motive fluid storage means, a conduit, means for pumping motive fluid from the motive fluid storage means to the conduit, the conduit being exposed to ambient air, a heat exchanger receiving the motive fluid from the conduit, means for passing the heat storage fluid in heat exchange relation with the motive fluid in the heat exchanger, a solar heating line receiving the motive fluid from the heat exchanger, means for concentrating solar energy on the solar heating line to heat the motive fluid therein, turbine means receiving the motive fluid from the solar heating line to be driven thereby, a first stage condenser and a second stage condenser connected in series and receiving the motive fluid from the turbine means, means for directing cooling fluid in heat exchange relation with the motive fluid in the second stage condenser, a compressor receiving the motive fluid from the second stage condenser, a third stage condenser receiving the motive fluid from the compressor, means for directing cooling fluid in heat exchange relation with motive fluid in the third stage condenser, means for directing motive fluid from the third stage condenser to the motive fluid storage means, the pumping means retaining the motive fluid in the motive fluid storage means, the compressor being capable of holding the motive fluid in the motive fluid storage means at a sufficient pressure to remain a liquid at ambient temperature.

5. A system for converting solar energy into mechanical energy which comprises a motive fluid storage means, a conduit, means for pumping motive fluid from the motive fluid storage means to the conduit, the conduit being exposed to ambient air, a heat exchanger receiving the motive fluid from the conduit, means for passing the heat storage fluid in heat exchange relation with the motive fluid in the heat exchanger, a solar heating line receiving the motive fluid from the heat exchanger, means for concentrating solar energy on the solar heating line to heat the motive fluid therein, turbine means receiving the motive fluid from the solar heating line to be driven thereby, a first stage condenser and a second stage condenser connected in series and receiving the motive fluid from the turbine means, means for directing cooling fluid in heat exchange relation with the motive fluid in the second stage condenser, and means for directing the motive fluid from the second stage condenser to the motive fluid storage means.

References Cited in the file of this patent

UNITED STATES PATENTS

| | | | |
|---|---|---|---|
| 659,450 | McHenry | Oct. 9, 1900 |
| 1,002,768 | Shuman | Sept. 5, 1911 |
| 1,217,165 | Fessenden | Feb. 27, 1917 |
| 1,493,368 | Merz | May 6, 1924 |
| 2,636,129 | Agnew | Apr. 21, 1953 |
| 2,920,710 | Howard | Jan. 12, 1960 |
| 2,933,885 | Benedek et al. | Apr. 26, 1960 |
| 2,942,411 | Hutchings | June 28, 1960 |
| 2,968,916 | Taylor et al. | Jan. 24, 1961 |
| 2,969,637 | Rowekamp | Jan. 31, 1961 |

FOREIGN PATENTS

| 917,312 | France | Sept. 9, 1946 |
|---|---|---|
| 834,040 | Germany | Mar. 13, 1952 |